United States Patent
Angal et al.

(10) Patent No.: US 8,543,810 B1
(45) Date of Patent: Sep. 24, 2013

(54) DEPLOYMENT TOOL AND METHOD FOR MANAGING SECURITY LIFECYCLE OF A FEDERATED WEB SERVICE

(75) Inventors: Rajeev Angal, Santa Clara, CA (US); Malla V. Simhachalam, Santa Clara, CA (US); Srividhya Narayanan, Santa Clara, CA (US)

(73) Assignee: Oracle America, Inc., Redwood City, CA (US)

(*) Notice: Subject to any disclaimer, the term of this patent is extended or adjusted under 35 U.S.C. 154(b) by 1482 days.

(21) Appl. No.: 11/462,780

(22) Filed: Aug. 7, 2006

(51) Int. Cl.
 *H04L 29/06* (2006.01)
(52) U.S. Cl.
 USPC .................. 713/155; 726/8; 705/50
(58) Field of Classification Search
 USPC ........................ 726/8, 14; 713/155
 See application file for complete search history.

(56) References Cited

U.S. PATENT DOCUMENTS

| | | | |
|---|---|---|---|
| 2003/0130857 A1* | 7/2003 | Matsuo | 705/1 |
| 2004/0128546 A1* | 7/2004 | Blakley et al. | 713/201 |
| 2006/0069717 A1* | 3/2006 | Mamou et al. | 709/203 |

OTHER PUBLICATIONS

Asuman Dogac, "Enhancing IHE XDS for Federated Clinical Affinity Domain Support", Mar. 2007, IEEE, pp. 213-221.*
Microsoft Corporation, Chapter 7—"WS-I BSP Interoperability Guidance", Patterns & Practices, May 2006.
"Liberty Alliance Project—a Technology Overview", Slide Presentation, Date Unknown.
"Introduction to Liberty Alliance", Slide Presentation, Date Unknown.

* cited by examiner

*Primary Examiner* — Morshed Mehedi
*Assistant Examiner* — Gregory Lane
(74) *Attorney, Agent, or Firm* — Martine Penilla Group, LLP

(57) ABSTRACT

A method for managing a security lifecycle of a federated web service provider (WSP) is described. The method includes populating a graphical user interface with available security mechanisms, receiving a selection of a selected security mechanism from a user, and creating a deployment time policy generator for instantiating the selected security mechanism in outgoing messages generated by the WSP. A system and machine readable-medium for a deployment tool for performing the method are also described.

15 Claims, 7 Drawing Sheets

DEPLOYMENT TOOL AND METHOD FOR MANAGING SECURITY LIFECYCLE OF A FEDERATED WEB SERVICE

BACKGROUND

Many services provided through the Internet require that the user first be authenticated before the services can be provided. Authentication is the process of attempting to verify the identity of the sender of a communication. The sender being authenticated may be a person using a computer, a computer itself or a computer program. For example, when accessing a bank account, a user may be required to log in by providing a username and password combination before the bank records can be accessed. Traditionally, a single service provider both authenticates the user and provides the service.

This centralized model has led to a proliferation of disconnected online user identities, and reduces privacy and convenience of users. Privacy is compromised when a user is asked to identify himself to the service provider for even minimal privileges. Each service provider may therefore maintain private information regarding the user which is subject to theft or misuse. Furthermore, the task of managing multiple usernames and passwords for various online activities is cumbersome at best.

To overcome the disadvantages associated with the traditional centralized model, the federated model has been proposed and implemented by various entities, such as the Liberty Alliance Project (LAP) and the OASIS WS-Security and associated Web Services Interoperability Organization (WS-I). Protocols developed by these organizations allow a web service provider to delegate authentication and/or authorization tasks to a trusted identity provider. This improves the convenience and privacy of the user e.g., by providing a single sign-on (SSO) capability, and gives the user more control over personal information.

FIG. 1 shows an exemplary implementation of a web service federation 10. In this example, user 12 accesses web service consumer (WSC) 14. WSC 14 may be an Internet portal providing weather, stock information, banking information to user 12 via an Internet connection 15. Alternatively, WSC 14 may be an application such as a video-on-demand device for accessing streaming multimedia content. Web service provider (WSP) 16 provides the data while identity provider (IDP) 18 authenticates user 12 and/or WSC 14, depending on the authentication requirements of the WSP. WSC 14 has several choices when invoking a WSP. It could invoke the WSP on the user's behalf, in which case the WSP will verify the user's credentials. It could also invoke the WSP on the user's behalf but additionally present its own credentials, in which case the WSP will verify both. Alternatively, the WSC can invoke the WSP in its own right. When a WSC invokes a WSP in its own right, the WSC would have already satisfied itself on the user's identity and a relationship exists between the WSC and the WSP, e.g., brokered via the trusted authority 19, that allows the WSP to only verify WSC credentials. The trusted authority provides a registry for federation members and the services that they provide along with authentication requirements. The trusted authority therefore brokers trust between the WSC 14 and WSP 16. In LAP federations, it is referred to as a discovery service. It should be noted that from a lifecycle perspective, the trusted authority is not always required. For example, the WSP may be preconfigured with the correct and acceptable authentication mechanisms.

Each Internet connection 15 may comprise any of various technologies enabling secure communication. For example, Internet connections 15 may each comprise a transmission control protocol (TCP) connection over which messages are passed by hypertext transfer protocol (HTTP) with transport layer security (TLS), thereby providing a secured, encrypted connection over the Internet. TLS is the successor to the secure sockets layer (SSL) specification. It can be seen that for the web service federation to function, WSC 14, WSP 16, and IDP 18 must work together in what is known as a "circle of trust" 20. The phrase, "circle of trust" refers to a group of service providers and identity providers that have business relationships based on a federated architecture and operational agreements and with whom users can transact business in a secure and apparently seamless environment.

FIG. 2 shows a swimlane diagram 50 illustrating an exemplary transaction for supplying federated web services from WSP 16 to WSC 14 and user 12. Exemplary web services could include weather, stock, banking, or multimedia data. User 12 initially submits a request 52 to WSC 14. The request may be made over an Internet connection or locally. The WSC application then sends a SOAP message 54 to WSP 16 to invoke the service. A SOAP message is a message sent using the SOAP protocol, a well-known, widely available protocol for exchanging extensible markup language (XML) based messages over a computer network, typically on top of an HTTP layer. If WSP 16 requires authentication of user 12 prior to supplying the particular service requested, it may send a redirect message 56 to WSC 14, to redirect WSC 14 to IDP 18, for authentication.

WSC 14 then contacts IDP 18 and sends an assertion request 58. The request may include any of various identifying information from user 12, such as a username and password. If sufficient, IDP 18 responds with an assertion 60, including a security token. One example of such a security token is a Security Assertion markup Language (SAML) security token, which is a signed message that can be authenticated by WSP 16. The federation specifications and the identity provider will specify what types of security tokens are available. WSC 14 then sends a new invoke message 62, this time including the security token, which assures WSP 16 that user 12 is sufficiently authenticated by IDP 18, which issued the token.

It should be noted here that WSP 16 does not require a separate username and password of user 12, and the username and password need not be stored with the WSP 16. Any number of WSPs can work with IDP 18 to obtain such authentication. Furthermore, the assertion requested and delivered by IDP 18 may be limited to specific facts about the user, rather than the user's actual identity. This is sometimes referred to as a blind credential. For example, if the web service is simply providing a weather forecast, the assertion may provide that the user has authorization to view the weather forecast, and further, the user's zip code (or other geographical identifier such as a city name) so that the weather forecast can be tailored to the user's geographical location.

LAP architecture currently includes specifications for over 20 different security token types and WS-I architecture supports four security toekens. Some of the security tokens supported by LAP and WS-I are SAML security tokens. Each token type can provide a different type of security mechanism, from no additional security (relying instead on the underlying SSL/TLS on top of which HTTP and other transfer protocols are provided) to very strong security. A variety of security mechanisms are therefore implemented using the various SAML security tokens. This provides flexibility according to need. For example, stronger SAML security tokens provide enhanced security for protecting sensitive information, while weaker SAML security tokens require fewer resources. The level of security can therefore be tailored to the sensitivity of the information being provided to or from the WSP.

Since LAP, WS-I, and other security standards bodies only provide specifications for the protocol and schema specifications for interoperation between the WSC and the WSP, there is a gap in terms of how the web services manage security. Currently, federation protocols are hard-wired into the business logic at both ends of the conversation. This causes difficulties during the lifecycle of the web service provider due to changes in security needs or when new security mechanisms are created. As a result, a large cost is incurred in manually redeploying an application when new or different security mechanisms are required to be incorporated therein.

Therefore, a deployment tool and processes are needed that ease the adoption of the latest security technologies to protect both existing web services as well as new web services. Such a system should be less error-prone and protect security at both ends of a WSP and WSC interaction, as well as enable easy management of the lifecycle of a web service from a security perspective.

SUMMARY

Broadly speaking, the present invention fills these needs by providing a deployment tool and method for managing security lifecycle of a Federated web service. It should be appreciated that the present invention can be implemented in numerous ways, including as a process, an apparatus, a system, a device, or a method. Several inventive embodiments of the present invention are described below.

In one embodiment, a method for managing a security lifecycle of a federated web service provider (WSP) is provided. The method includes populating a graphical user interface with available security mechanisms, receiving a selection of a selected security mechanism from a user/deployer, and creating a deployment time policy generator for instantiating the selected security mechanism in outgoing messages generated by the WSP.

In another embodiment, a machine readable medium embodying computer program instructions for managing a security lifecycle of a federated web service provider (WSP) is provided. The machine readable medium comprise program instructions for populating a graphical user interface with available security mechanisms, program instructions for receiving a selection of a selected security mechanism from a user/deployer, and program instructions for creating a deployment time policy generator causing the selected security mechanism to be instantiated into outgoing messages generated by the WSP. The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

The technology described herein relates to a system and method for deploying and managing web service providers that are members of a web services federation. The term "user" as used herein, may refer to an individual accessing a web services consumer (WSC) which in turn accesses a web services provider (WSP) or it could be the person developing and/or deploying a web services provider WSP. In some instances, the person deploying the web services provider will be referred to as "deployer". The technology described herein is able to abstract the union of all security mechanisms to both hide and separate the security mechanisms from the business logic and hiding protocol specifics from the deployer.

Figure 3:
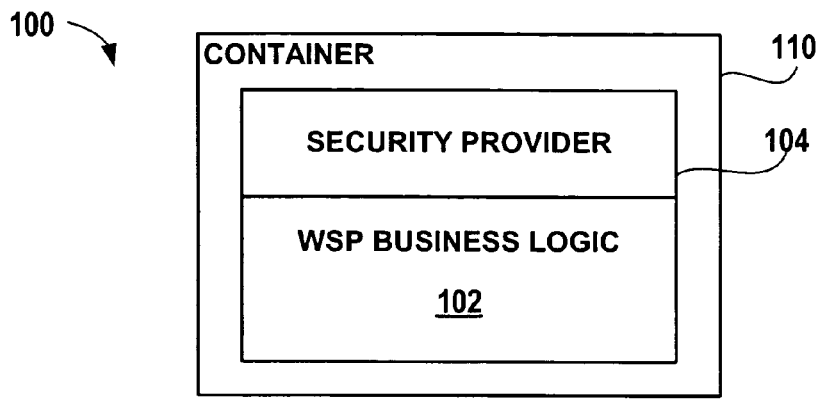
FIG. 3 shows a schematic diagram illustrating an exemplary web service provider (WSP).

FIG. 3 shows a schematic diagram illustrating an exemplary web service provider (WSP) 100. One feature of WSP 100 is the separation of business logic module 102 from security provider 104. In effect, business logic module 102 delegates security functionally to security provider 104. The business logic module 102 and the security provider may reside in a container 110, such as a Java Platform Enterprise Edition (Java EE) container, which was previously referred to as Java 2 Platform Enterprise Edition (J2EE). Containers are the interface between a component and the low-level platform-specific functionality that supports the component. Other technologies, such as the .NET framework available from Microsoft, Inc., can also be used. In one embodiment, security provider 104 is constructed using a Java Authentication and Authorization Service (JAAS) module, or according to Java Specification Request (JSR) 196.

Figure 4:
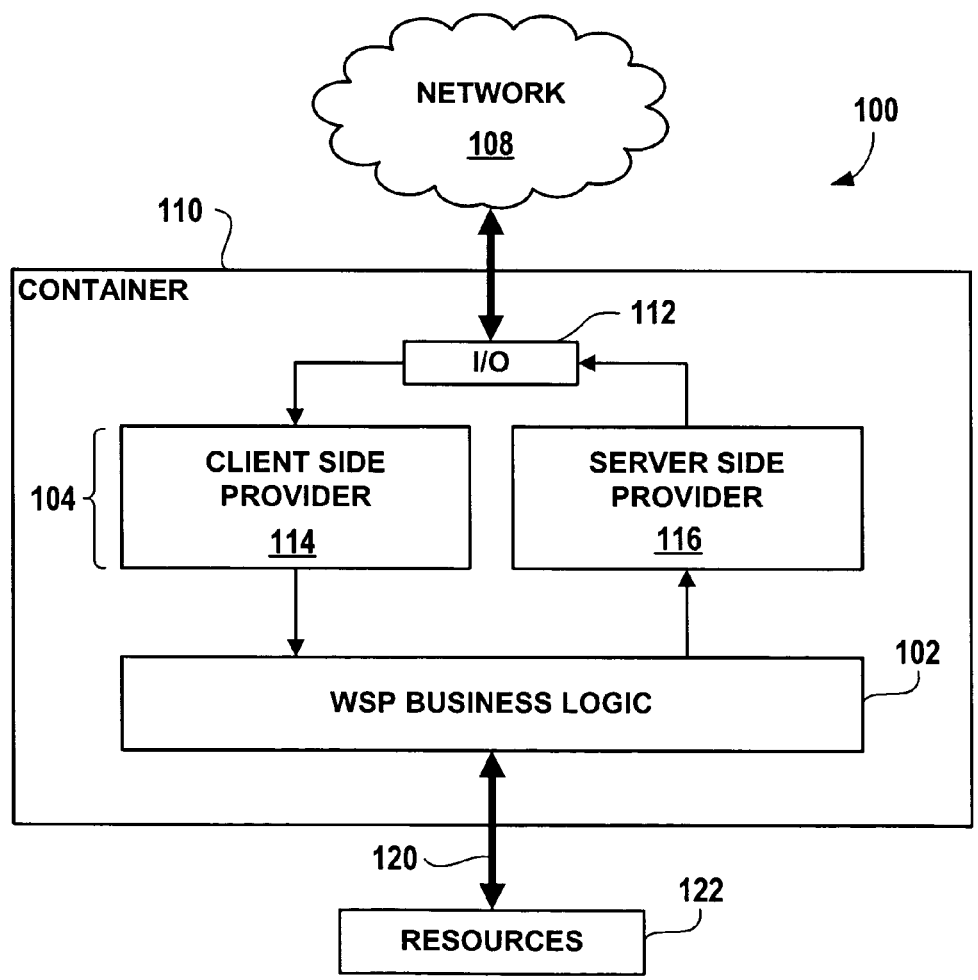
FIG. 4 shows a schematic diagram illustrating an exemplary configuration and connectivity for the WSP of FIG. 3.

FIG. 4 shows a schematic diagram illustrating an exemplary configuration and connectivity for WSP 100. As mentioned above with respect to FIG. 3, container 110 may be a Java EE container or a .NET container, or other container providing similar functionality. Container 110 provides an interface between a software component and low-level platform specific functionality, and may include a variety of application program interfaces (APIs) to carry out various functions. Thus, each component within container 110 is a software module. I/O module 112 provides communication with network 108 and implements protocols as necessary for transmitting SOAP messages with a counterpart web service consumer (WSC).

Incoming messages are received by client side provider 114. The messages are processed as described below with reference to FIG. 5 and the body of the message is passed to business logic module 102. Business logic module 102 implements the WSP function. For example, if the function is to provide stock quotes, then they are gathered using connection 120 to resources 122, which may be maintained locally or are otherwise accessible to business logic module 102. For example, the resources 122 may be present on a local hard drive accessible via a local PCI bus, or resources 122 may be provided by a remote WSP. In the latter case, WSP 100 acts like a WSC in requesting the information from the remote WSP. Such a transaction can exist, for example, when booking an airline flight and the booking agent, which is a WSP to the user, becomes a WSC to obtain flight information from additional WSPs maintained by airlines.

Once the incoming message is processed by business logic module 102, a response is generated, which may include requested information, an acknowledgement that a particular request has been fulfilled, or other response. The response is passed to server side provider 116, which packages the message according to the selected security mechanism as described below with reference to FIG. 6. The packaged message is then sent to the WSC via network 108 using I/O module 112. By providing separate security modules for handling security tokens, a different or updated security mechanism can selected without modifying business logic module 102.

Figure 5:
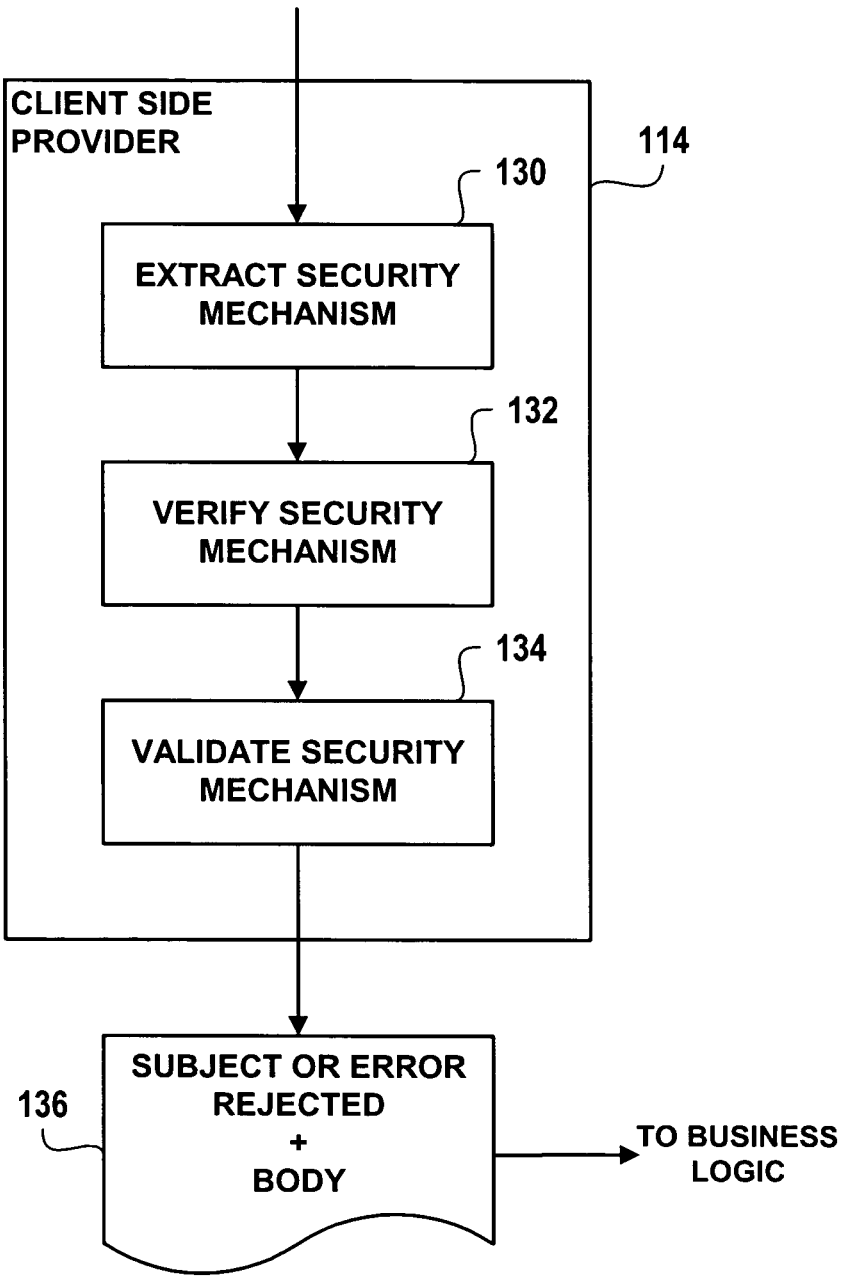
FIG. 5 is a diagram showing exemplary internal processes performed by client side provider.

FIG. 5 is a diagram showing exemplary internal processes performed by client side provider 114. Client side provider 114 receives a SOAP message from I/O module 112 (FIG. 4) and performs three main operations on the received SOAP message. In various embodiments, each operation is performed by a distinct submodule, or the functions are integrated into a single software component. In operation 130, the header is extracted from the message. As is generally understood in the art, the SOAP protocol includes a possibility of including both a header section and a body section. Headers are provided by the SOAP protocol to allow information that is not application payload to be passed along with the message. According to LAP specifications, the SOAP header may contain zero, one, or more security tokens, a user identifier, a WSC identifier, and attributes. Each security token may be of a type specified according to the federated model, e.g., Security Assertion Markup Language (SAML), x509, Kerberos, Binary, user ID and password, or other type of security token. Attributes may contain any information regarding the user, transaction, WSC, etc. If a security token is present, it is extracted. In other federation specifications, the security tokens and other information may be provided in the body of the SOAP message, or provided using a different protocol altogether. Those skilled in the art will recognize that extracting the token, which encapsulates the security mechanism, from the larger message may take many forms.

After extracting the token, it is processed in operation 132. Processing the token requires verifying that the security mechanism, e.g., token type, corresponds with acceptable token types as specified at the time of deployment and conforms to the rules relating to policy. As mentioned, a particular federation specification may provide for many different types of security mechanisms, where only certain ones are appropriate for a particular application or transaction. Therefore, the deployer may specify which security mechanisms are acceptable, and this dictates the token type which implement the security mechanism. If a particular security mechanism is not acceptable, then it is denied and a security error is passed to the business logic as provided below, which then returns an error to the WSC. In addition, the token must conform to particular policy implemented by the deployer. The policy may comprise any number of rules relating to the transaction type, who the WSC is, the date or time of day, etc. For example, some tokens types may be acceptable from certain WSCs and not others. Certain messages may be denied from certain consumers depending on the time of day. These rules can be easily implemented as described in greater detail below with reference to FIG. 9. If the token is of an acceptable type and conforms to the policies, then client side provider 114 performs validates the token in operation 134. The message is also processed to verify that all the digital signatures are valid. Digital signatures ensure that data integrity of the message and that the was actually transmitted by the WSC holding the token and that After examining the header, the security token is validated in operation 134. Token validation comprises performing any steps necessary to verify that the token originated from a trusted IDP and is genuine. The steps required for validating security tokens vary with the token type, as generally understood by those in the art. Once the security token is validated, the user is authenticated and the header information including user identifier, WSC identifier, and attributes are sent to the business logic module along with the message body as output 136. If the digital signature is defective or the token is an invalid type or is defective, then an error message is generated which is also sent to the business logic.

Figure 6:
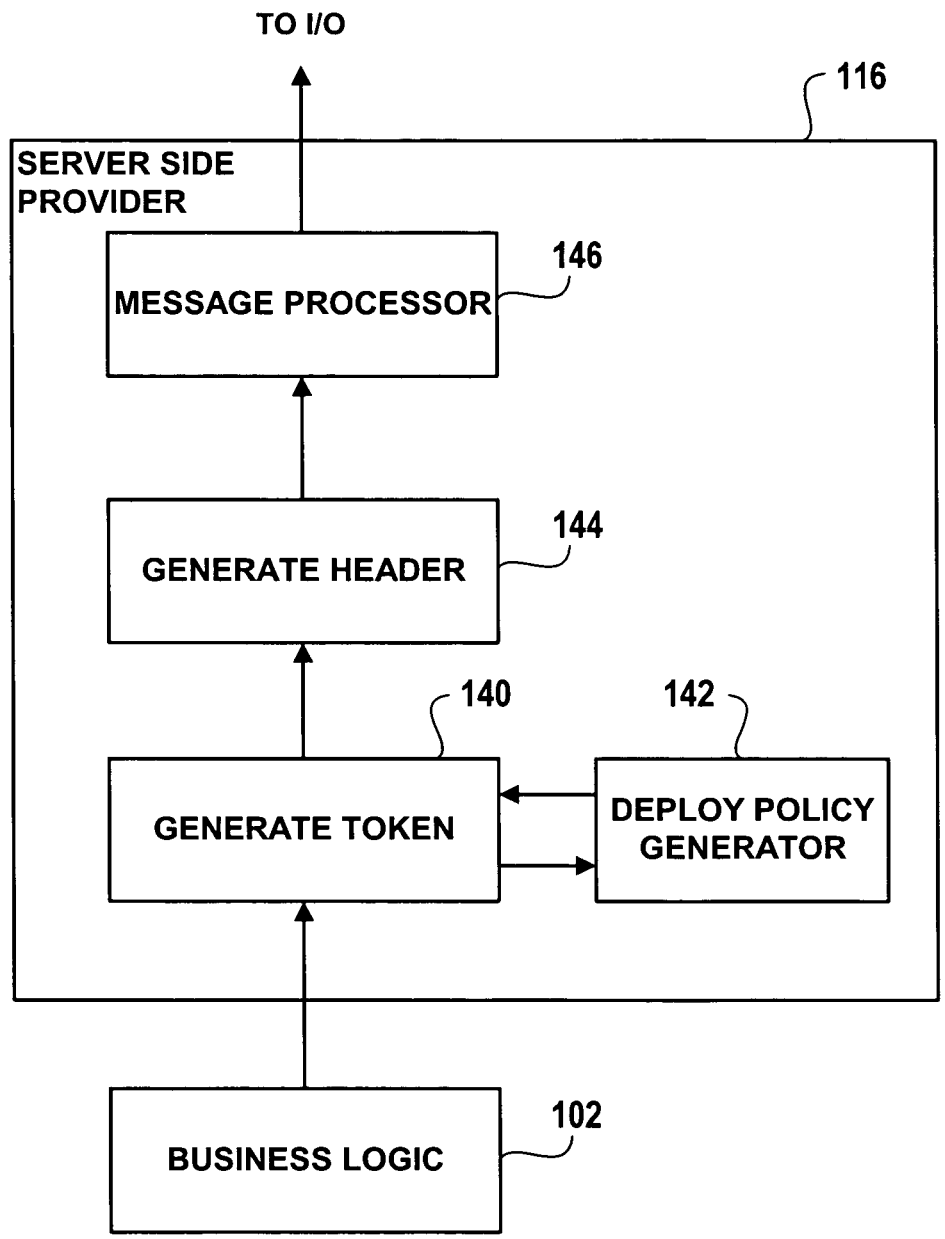
FIG. 6 provides a diagram showing exemplary internal processes performed by server side provider.

FIG. 6 provides a diagram showing exemplary internal processes performed by server side provider 116. Once a response message is generated by business logic 102, it is forwarded to server side provider 116, which applies security mechanisms according to the token type and policies which may be bound to each transaction type at deployment time. Thus, in the initial operation 140, a token is generated. As mentioned, a particular federation specification may include many different types of security mechanisms and token types. The LAP, for example, provides specifications for over 20 security token types, some of which are SAML security tokens. The type of security token generated in operation 140 depends on the transaction type and the policy established at the time of deployment by deploy policy generator 142.

After the security token is generated, the procedure flows to operation 144 wherein the header is generated. Once the header is generated, the security token generated in operation 140 is inserted into the header of the response. After inserting the security token, the procedure flows to operation 146 wherein the message is processed according to the federation rules for the particular token. Typically, the rules provide that the header is encrypted and signed, the body is signed, and subject and other information is added to the header. Once the message processing is complete, it is passed to I/O 112 (FIG. 4) and transmitted to the corresponding WSC.

Figure 7:
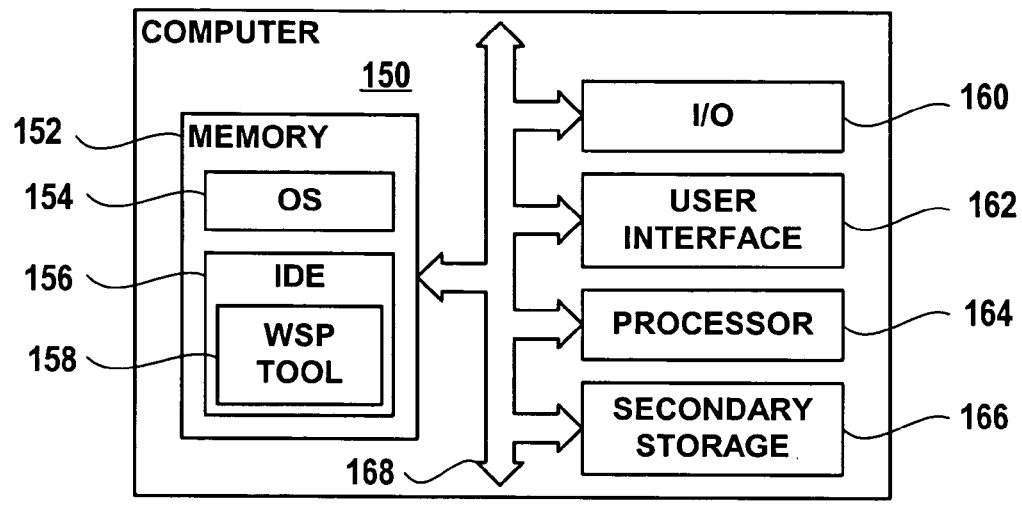
FIG. 7 shows an exemplary general-purpose computer system suitable for running an integrated development environment (IDE) with an integrated WSP deployment tool.

FIG. 7 shows an exemplary general-purpose computer system 150 having a memory 152, i/o subsystem 160, user interface 162, processor 164 in electronic communication via a buss 166, and secondary storage 166. Computer system 150 may be used to execute a WSP on a network and/or to create an implementation of a WSP. Memory 152 includes an operating system 154 and an integrated development environment (IDE) to assist a computer programmer in generating computer code. In one embodiment, IDE 156 is a development environment for developing applications for execution on a Java EE platform and includes a WSP deployment tool 158 for deploying WSP applications. In one embodiment, WSP deployment tool 158 comprises a plug-in or add-on software component to IDE 156. In other embodiments (not shown) WSP deployment tool 158 is a separate application.

Figure 8:
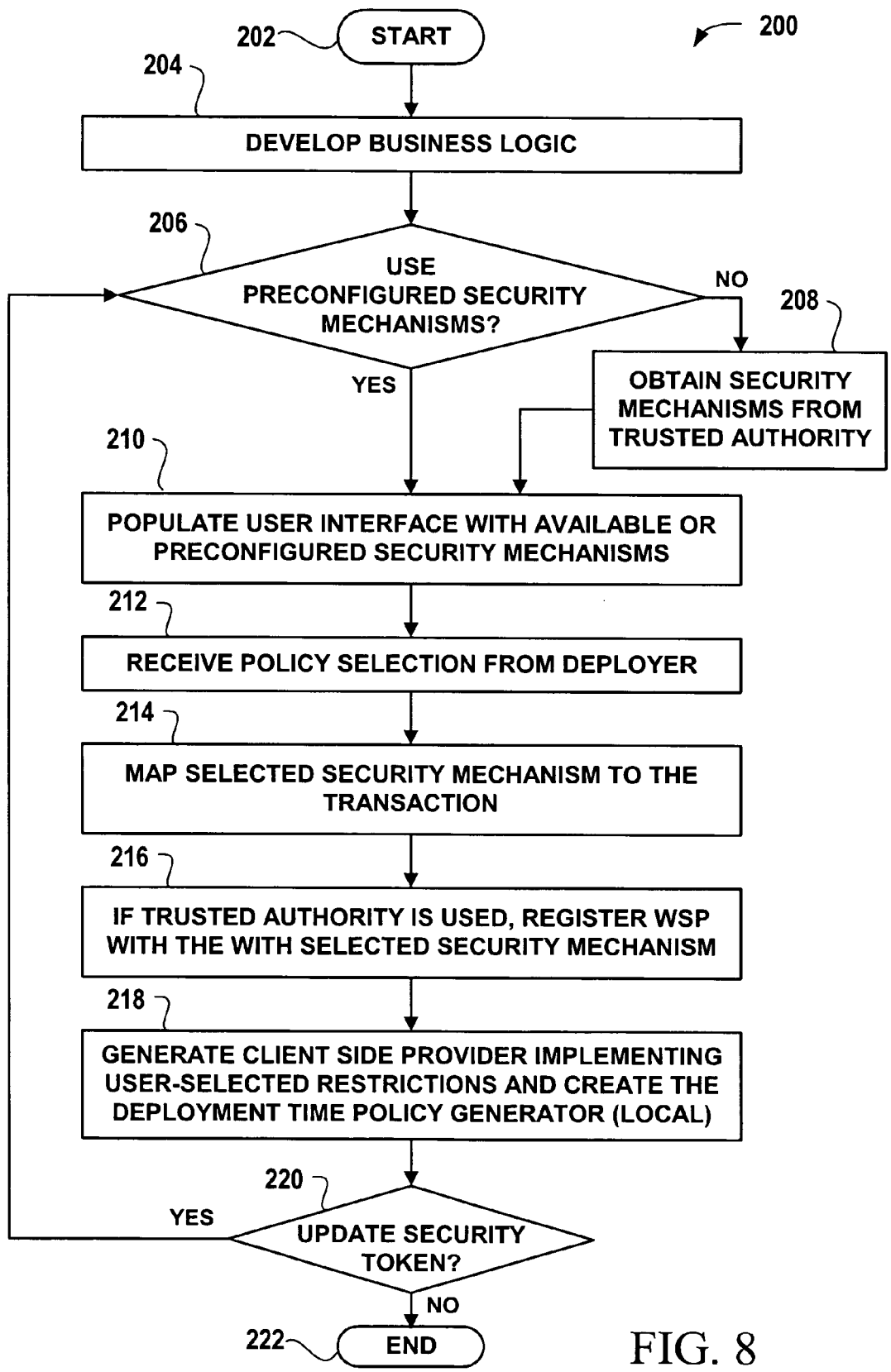
FIG. 8 shows a flowchart depicting an exemplary procedure for deploying a WSP using the WSP deployment tool of FIG. 7.

FIG. 8 shows a flowchart 200 depicting an exemplary procedure for deploying a WSP using WSP deployment tool 158 described above with reference to FIG. 7. The procedure is generally performed at deployment time. In addition, the procedure may be implemented at any time during the lifecycle of the WSP to redeploy with different or updated security mechanisms.

The procedure begins as indicated by start block 202 and flows to operation 204 wherein the business logic is developed. Business logic 102 (FIGS. 4, 6) carries out the main purpose of the WSP. If a service is being redeployed, then it may not be necessary to further develop or update existing business logic. Once the business logic is completed, the procedure flows to operation 206 wherein it is determined whether preconfigured security mechanisms will be used. Whether preconfigured security mechanisms are used or whether the security mechanisms will be configured according to a policy obtained from a trusted authority will depend on the specific implementation. The deployer will determine based on the needs of the particular web service and the WSCs that will be accessing the web service if it is appropriate to preconfigure the security mechanism. For example, the WSC can invoke a WSP directly if it already knows the endpoint URL where the WSP is available, what security mechanisms are acceptable to the WSP, and how to generate those security tokens. The trusted authority, referred to in LAP specifications as the discovery service, encapsulates this information in a "ResourceOffering" message. Therefore, if the supported security mechanisms and other information is already known, the procedure may proceed directly to operation 210, otherwise, the procedure flows to operation 208.

Figure 1:
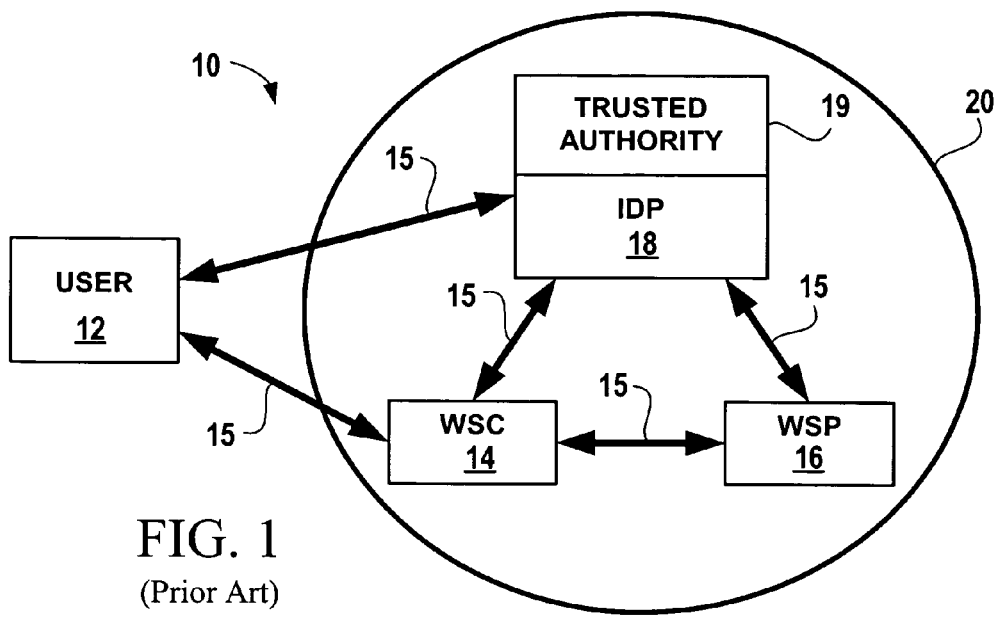
FIG. 1 shows an exemplary implementation of a Liberty enabled web service.
Figure 2:
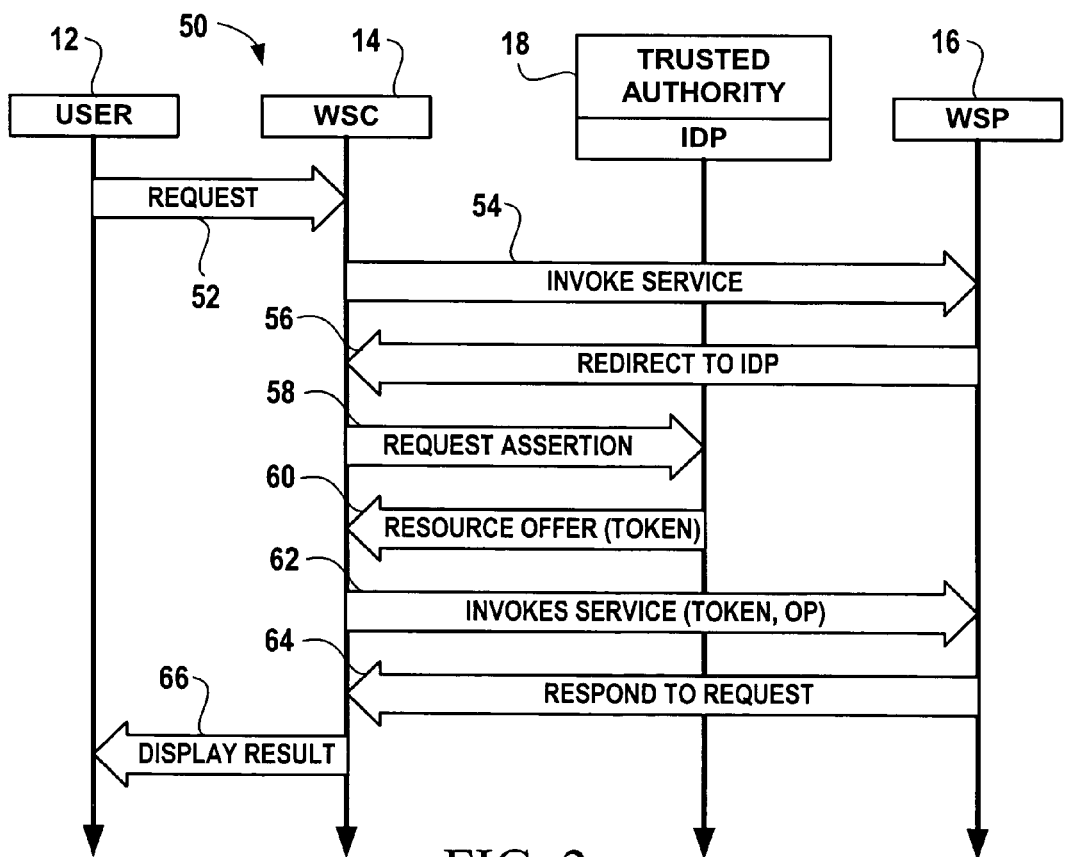
FIG. 2 shows a swimlane diagram illustrating an exemplary transaction for supplying federated web services.

In operation 208, the WSP deployment tool determines what security mechanisms are supported by the trusted authority. As mentioned above with reference to FIG. 1, a trusted authority is connected to the IDP to provide information on services provided, e.g., by providing a web services description language (WSDL) XML document. The security mechanisms supported by the trusted authority are retrieved from the trusted authority and the procedure flows to operation 210.

Figure 9:
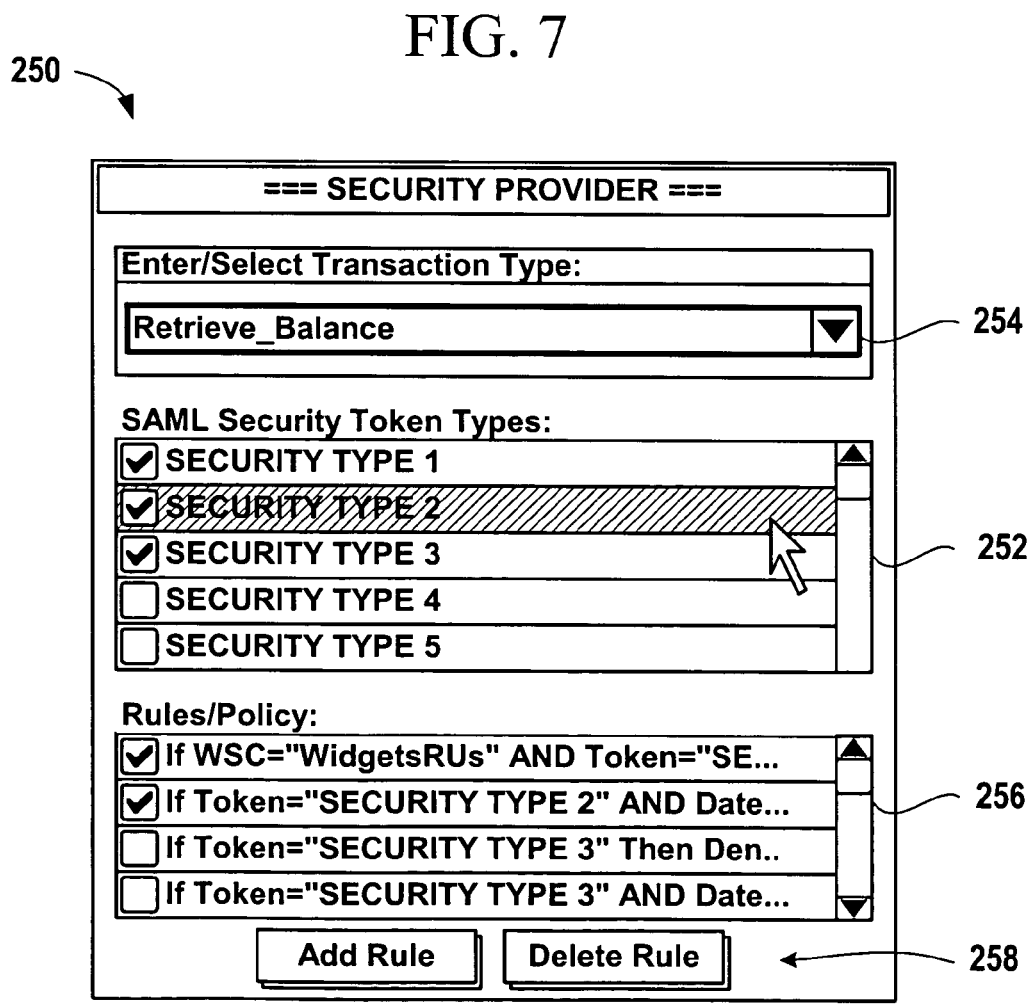
FIG. 9 shows an exemplary graphical user interface for selecting security mechanisms using the WSP deployment tool of FIGS. 7 and 8.

In operation 210, the graphical user interface is populated with identifiers of available security mechanisms provided by the WSP deployment tool, or, if using the trusted authority, the security mechanism identifiers of security mechanisms that are supported by the trusted authority. An exemplary graphical user interface 250 is shown in FIG. 9, which features a list 252 of identifiers for security mechanisms that can be enabled or disabled by checking or clearing an initial check box for the selected transaction type 254. Graphical user interface 250 also includes a rules/policy list 256 that allows the user/deployer to select which rules from a list of available rules to apply to the current transaction type. The user may also add or remove rules by "Add Rule and "Delete Rule" buttons 258. When "Add Rule" is selected a rules wizard (not shown) is displayed for selecting from available variables for applying conditions. It should be noted that this graphical user interface is exemplary and other types of graphical user interfaces having similar functionality, as would occur to those skilled in the art, are also contemplated. Continuing with operation 212 in FIG. 8, the user selects, for each transaction type, one or more security mechanisms from the list of choices provided in the graphical user interface and/or specific policy rules to apply to the transaction type. The procedure then flows to operation 214.

In operation 214, the selected security mechanism is mapped to the selected or active transaction. By mapped, it is meant that some logical association is made between the transaction type and the selected security mechanism. Then, in operation 216, if the trusted authority is used, the WSP deployment tool registers the WSP and selected security mechanisms with the trusted authority. The registration protocol is specified by the specification for the federation protocol to ensure that the IDP is made aware of associated WSPs in the circle of trust along with their security rules for corresponding transactions. After registration, the procedure flows to operation 218 wherein the client side provider is generated which implements the user-selected policy restrictions, and the deployment time policy generator 142 (FIG. 6) is created. The deployment time policy generator directs server side provider 116 to select the deployer-selected security mechanism selected in operation 212. In one embodiment, the client side provider is an object generated from a class written in the JAVA programming language. The class serves as a template for the client side provider object. In one embodiment, the selected policy restrictions and methods for processing selected tokens are instantiated into the client side provider object from a library when it is generated. Those skilled in the art will understand that other components including the server side client and deployment time policy generator are generated in similar manner using the WSP deployment tool. It will also be understood that other programming languages such as C or C++ can be used in a similar manner to generate the required code, which may then be compiled along with the business logic to form the WSP that will run on a server computer.

After deployment of the WSP, it may be desirable to modify the security mechanisms, either because new security mechanisms become available or due to a change in security requirements. Such an opportunity to update the security mechanism selection is provided in operation 220, which determines whether an update is necessary. If so, the procedure returns to operation 206. If no updates are necessary, the procedure ends as indicated in operation 222. The capability to easily update security mechanisms without modifying the separate business logic is attributed to the separation of the business logic from the security provider logic as described above with reference to FIG. 3, and the WSP deployment tool integrated into the IDE as described above with reference to FIG. 7.

Figure 10:
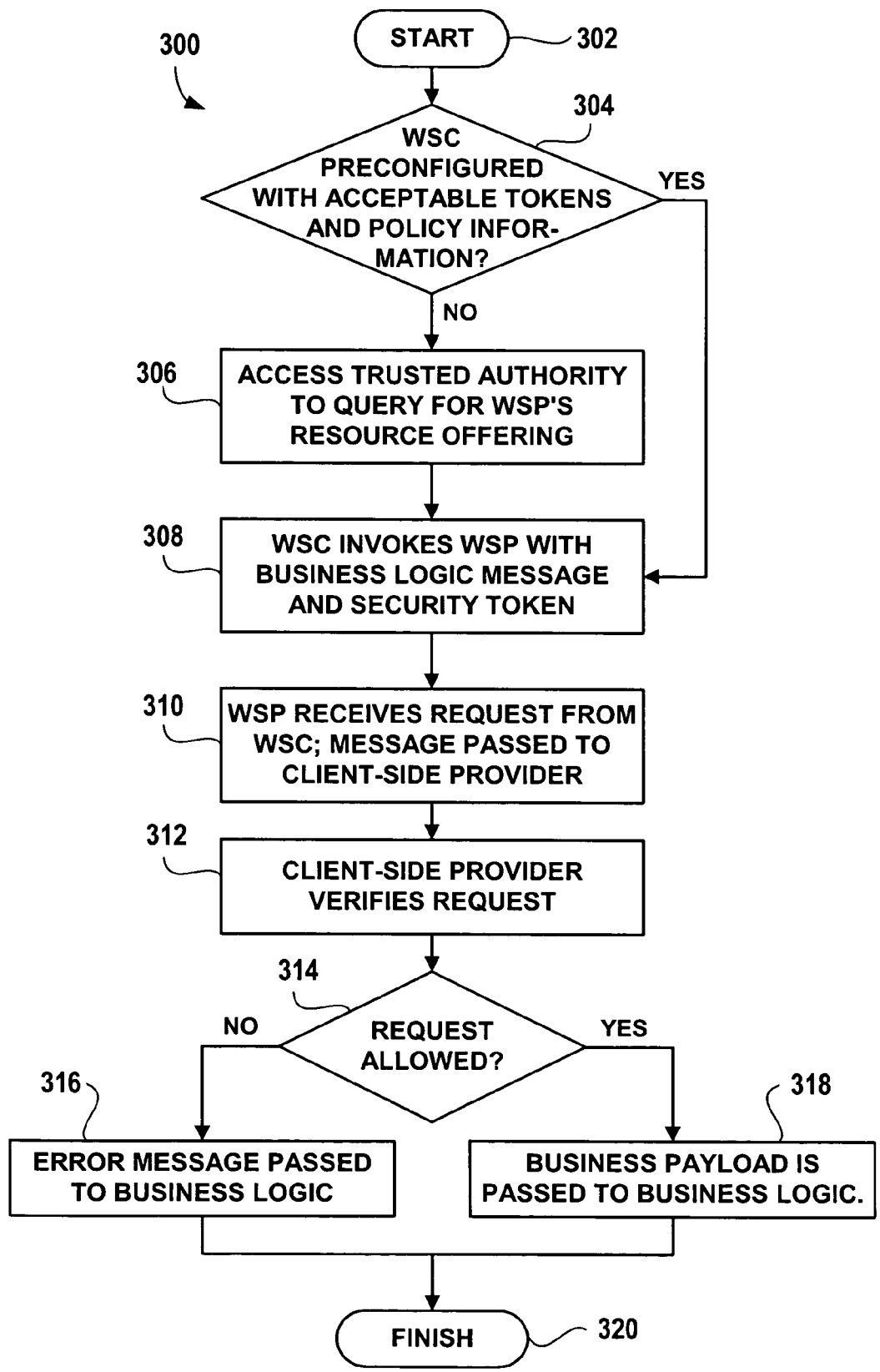
FIG. 10 shows a flowchart depicting an exemplary interaction between a web service consumer and a client side provider generated by the WSP deployment tool of FIG. 7.

FIG. 10 shows a flowchart 300 illustrating a procedure carried out by a WSC and WSP using a WSP created using the WSP deployment tool described herein. The procedure begins as indicated by start block 302 and flows to operation 304 wherein it is determined whether the WSC is preconfigured with acceptable tokens and policy information for the WSP. If the WSC is preconfigured with this information, then the procedure flows to operation 308. Otherwise, the procedure flows to operation 306, in which the WSC accesses the trusted authority to query for the WSP's resource offering. The resource offering will include information on the endpoint URL where the WSP is available, what security mechanisms are acceptable to the WSP, and how to generate those security tokens. As mentioned, if this information is already preconfigured into the WSC, then this operation is skipped. Once this information is retrieved from the trusted authority, the procedure flows to operation 308.

In operation 308, the WSC invokes the WSP with a business logic message and security token. As noted previously, not all transactions will require a security token. Some transactions may rely instead on the underlying SSL/TLS security protocol, which is a very common and well understood security layer of the Internet protocol stack. In operation 310, the WSP receives the message from the WSC, passes it to the client side provider, which is generated by the WSP deployment tool. As mentioned above with reference to FIG. 5, the client side provider extracts the security token(s) from the message if present. Then the procedure flows to operation 312.

In operation 312, the client-side provider, verifies the request by comparing the security token (if present) to permitted security tokens in accordance with the policy selections made by the deployer for the particular transaction requested. Likewise, if no security token is present, it is determined whether one is necessary for the requested transaction as selected by the deployer at the time of deployment. If the security token is of the appropriate type and conforms to the policy selection, then it is validated to ensure that it is genuine and that the business message has not been corrupted. Thus, the client side provider is configured to discriminate between acceptable and unacceptable messages according to the selected security mechanisms and policy selections. If no errors result from the verification and validation of the security mechanisms, then the request is allowed and the procedure flows to operation 318, or else the request is denied and the procedure flows to operation 316.

In operation 316, an error message is generated and passed to the business logic. In one embodiment, the error messages is passed along with the business message. In another embodiment, the error message is passed by itself. It is also possible for the client side provider to transmit the error back to the WSC directly. Once the error message is passed to the business logic, the procedure ends as indicated by operation 320.

In operation 318, the business message (payload) is passed to the business logic where it is then acted on by the business logic. The procedure for receiving a request then ends as indicated by operation 320. The business will generate a response, which may be simply an acknowledgement or which may include requested information. The response is transmitted back to the WSC using the server side provider as described above with reference to FIG. 6.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for deploying a federated web service provider (WSP), the method comprising:
   populating a graphical user interface with a plurality of security mechanism identifiers each corresponding to a security mechanism for one or more transactions, for selection by a deployer, the plurality of security mechanism identifiers maintained by a security provider module that is distinct from a business logic module used to identify security mechanism identifiers for populating the graphical user interface, wherein the business logic module implements a function of the WSP and delegates security functionality to the security provider module;
   receiving a selection of a transaction type associated with the one or more transactions;
   receiving deployer selection of one of the security mechanism identifiers appropriate for the transaction type associated with the one or more transactions, the selected security mechanism identifier mapped to the transaction type of the one or more transactions to provide a level of security based on sensitivity of the one or more transactions;
   generating a client-side provider for identifying the transaction type of each of one or more incoming messages of the one or more transactions and implementing the deployer selections to permit or disallow security mechanisms of the incoming messages in accordance with the deployer selection of security mechanism mapped to the transaction type of the incoming messages, the incoming messages being messages received by the WSP;
   receiving updates to one or more security mechanisms; and
   updating the security mechanisms maintained by the security provider module without modifying the business logic module, wherein updating includes mapping the updated security mechanism to the one or more transactions during generation of the client-side provider.

2. The method of claim 1, further comprising:
  populating the graphical user interface with available policy rules;
  indicating which of the available security mechanisms are enabled for the transaction type selected;
  indicating which of the deployer-defined policy rules are enabled for the transaction type selected;
  causing the enabled security mechanisms to be mapped to the transaction type in response to the deployer selections of security mechanisms and causing the policy rules to be changed in response to deployer selections of policy rules; and
  configuring the client side provider to enforce policy rules enabled for a transaction type corresponding to the transaction type of the incoming message.

3. The method of claim 1, further comprising:
  creating a deployment time policy generator causing the selected security mechanism to be inserted into outgoing messages generated by the WSP.

4. The method of claim 1, further comprising:
  accessing a trusted authority to determine what security mechanisms are supported by the trusted authority, the plurality of security mechanism identifiers corresponding to the security mechanisms supported by the trusted authority; and
  registering the WSP with the trusted authority, the registering comprising information identifying security mechanisms that are acceptable to the WSP, the acceptable security mechanisms corresponding to the user selections.

5. The method of claim 4 wherein the registering comprises providing a resource offering message, the resource offering message including an endpoint URL where the WSP is available, the security mechanisms that are acceptable to the WSP, and information on how to generate security tokens corresponding to the acceptable security mechanisms.

6. A method for deploying or redeploying a federated web service provider (WSP), the method comprising:
  populating a graphical user interface with a plurality of security mechanism identifiers corresponding to security mechanisms appropriate for one or more transactions selected by a deployer, the plurality of security mechanism identifiers maintained by a security provider module distinct from a business logic module that is used to identify security mechanism identifiers for populating the graphical user interface, wherein the business logic module implements a function of the WSP and delegates security functionality to the security provider module;
  populating the graphical user interface with available deployer-defined policy rules;
  receiving a selection of a transaction type;
  indicating which of the available security mechanisms are enabled for the transaction type;
  indicating which of the deployer-defined policy rules are enabled for the transaction type;
  receiving deployer selections causing the enabled security mechanism and enabled user-defined policy rules to be changed, the changed security mechanism and user-defined policy rules mapped to the one or more transactions;
  generating a client-side provider implementing the deployer selections to permit or disallow security mechanisms of incoming messages of the one or more transactions in accordance with the deployer selections and enforce the policy rules on the incoming messages, the incoming messages being messages received by the WSP;
  generating a deployment time policy generator causing the selected security mechanism to be inserted into outgoing messages generated by the WSP;
  receiving updates to one or more security mechanisms; and
  updating the security mechanisms maintained by the security provider module without modifying the business logic module, the updating causing the updated security mechanisms to be inserted into the outgoing messages generated by the WSP independent of the business logic.

7. The method of claim 6, further comprising:
  receiving deployer input for creating a new policy rule, the new policy rule being added to the list of available deployer-defined policy rules.

8. The method of claim 6, wherein, when the security mechanism of an incoming message is the client-side provider validates the security mechanism.

9. The method of claim 6, wherein the WSP resides within a circle of trust, the method further comprising:
  accessing a trusted authority within the circle of trust to determine what security mechanisms are supported by the trusted authority, the available security mechanisms being the security mechanisms supported by the trusted authority.

10. The method of claim 6, wherein the WSP resides within a circle of trust, the method further comprising:
  registering the WSP with a trusted authority within the circle of trust with selected security mechanism.

11. A non-transitory machine readable medium embodying computer program instructions which when implemented by a computer system performs a method for managing a security lifecycle of a federated web service provider (WSP), the machine readable medium comprising:
  program instructions for populating a graphical user interface with a plurality of security mechanism identifiers each corresponding to a security mechanism for one or more transactions for selection by a deployer, the plurality of security mechanism identifiers maintained by a security provider module distinct from a business logic module that is used to identify security mechanism identifiers for populating the graphical user interface, wherein the business logic module implements a function of the WSP and delegates security functionality to the security mechanism module;
  program instructions for receiving a selection of a transaction type associated with the one or more transactions;
  program instructions for receiving deployer selection of one of the security mechanism identifiers appropriate for the transaction type associated with the one or more transactions, the selected security mechanism identifier mapped to the transaction type of the one or more transactions;
  program instructions for generating a client-side provider for identifying the transaction type of each of one or more incoming messages of the one or more transactions and implementing the deployer selections to permit or disallow security mechanisms of the incoming messages in accordance with the deployer selection of security mechanism mapped to the transaction type of the incoming messages, the incoming messages being messages received by the WSP;
  program instructions for receiving updates to one or more security mechanisms; and program instructions for updating the security mechanisms maintained by the security provider module without modifying the business logic module, the updated security mechanism used in generating the client-side provider for the one or more transactions independent of the business logic module.

12. The machine readable medium of claim 11, further comprising:

program instructions for populating the graphical user interface with available policy rules;

program instructions for indicating which of the available security mechanisms are enabled for the transaction type selected;

program instructions for indicating which of the deployer-defined policy rules are enabled for the transaction type selected;

program instructions for causing the enabled security mechanisms to be mapped to the transaction type in response to the deployer selections of security mechanisms and causing the policy rules to be changed in response to deployer selections of policy rules; and program instructions for configuring the client side provider to enforce policy rules enabled for a transaction type corresponding to the transaction type of the incoming message.

13. The machine readable medium of claim 11, further comprising:

program instructions for creating a deployment time policy generator, the deployment time policy generator causing the selected security mechanism to be inserted into outgoing messages generated by the WSP.

14. The machine readable medium readable medium of claim 11, further comprising:

program instructions for accessing a trusted authority to determine what security mechanisms are supported by the trusted authority, the plurality of security mechanism identifiers corresponding to the security mechanisms supported by the trusted authority; and program instructions for registering the WSP with the trusted authority, the program instructions for registering comprising program instructions for providing information identifying security mechanisms that are acceptable to the WSP, the acceptable security mechanisms corresponding to the user selections.

15. The machine readable medium of claim 14 wherein the program instructions for registering further comprises program instructions for providing a resource offering message, the resource offering message including an endpoint URL where the WSP is available, the security mechanisms that are acceptable to the WSP, and information on how to generate security tokens corresponding to the acceptable security mechanisms.

* * * * *